United States Patent [19]
Ryan

[11] Patent Number: 6,092,363
[45] Date of Patent: Jul. 25, 2000

[54] LOW NOX COMBUSTOR HAVING DUAL FUEL INJECTION SYSTEM

[75] Inventor: William Richard Ryan, Orlando, Fla.

[73] Assignee: Siemens Westinghouse Power Corporation, Orlando, Fla.

[21] Appl. No.: 09/100,489

[22] Filed: Jun. 19, 1998

[51] Int. Cl.⁷ ........................................ F02C 3/20
[52] U.S. Cl. .......................... 60/39.463; 60/739
[58] Field of Search .................. 60/739, 740, 39.463

[56] References Cited

U.S. PATENT DOCUMENTS

| | | | |
|---|---|---|---|
| 4,100,733 | 7/1978 | Striebel et al. | 60/39.74 |
| 4,499,735 | 2/1985 | Moore et al. | 60/739 |
| 4,539,918 | 9/1985 | Beer et al. | 110/266 |
| 4,598,553 | 7/1986 | Saito et al. | 60/733 |
| 4,845,940 | 7/1989 | Beer | 60/732 |
| 5,351,477 | 10/1994 | Joshi et al. | |
| 5,359,847 | 11/1994 | Pillsbury et al. | 60/39.06 |
| 5,361,586 | 11/1994 | McWhirter et al. | 60/737 |
| 5,451,160 | 9/1995 | Becker | 431/284 |
| 5,511,375 | 4/1996 | Joshi et al. | 60/39.463 |
| 5,713,206 | 2/1998 | McWhiter et al. | 60/747 |

*Primary Examiner*—Timothy S. Thorpe
*Assistant Examiner*—Ehud Gartenberg
*Attorney, Agent, or Firm*—Eckert Seamans Cherin & Mellott, LLC

[57] ABSTRACT

A dual fuel injection system for a low Nox combustor in which separate gaseous and liquid fuel manifolds are integrally joined to form manifold assemblies. Each manifold assembly extends circumferentially around the inlet of an annular fuel and air mixing passage. The gaseous fuel manifolds have a number of gas discharge ports spaced around their circumferences. The liquid fuel manifolds have a number of fuel nozzles spaced around their circumferences. The gaseous fuel discharge ports and liquid fuel nozzles are oriented so as to inject fuel into the annular passages in a manner that will facilitate mixing of the fuel and air. Separate gaseous and liquid fuel supply tubes are connected to each manifold.

16 Claims, 3 Drawing Sheets

LOW NOX COMBUSTOR HAVING DUAL FUEL INJECTION SYSTEM

BACKGROUND OF THE INVENTION

The present invention relates to a gas turbine combustor. More specifically, the present invention relates to a dual fuel injection system for a low Nox combustor.

In a gas turbine, fuel is burned in compressed air, produced by a compressor, in one or more combustors. Traditionally, such combustors had a primary combustion zone in which an approximately stoichiometric mixture of fuel and air was formed and burned in a diffusion type combustion process. Additional air was introduced into the combustor downstream of the primary combustion zone. Although the overall fuel/air ratio was considerably less than stoichiometric, the fuel/air mixture was readily ignited at start-up and good flame stability was achieved over a wide range in firing temperatures due to the locally richer nature of the fuel/air mixture in the primary combustion zone.

Unfortunately, use of such approximately stoichiometric fuel/air mixtures resulted in very high temperatures in the primary combustion zone. Such high temperatures promoted the formation of oxides of nitrogen ("NOx"), considered an atmospheric pollutant. It is known that combustion at lean fuel/air ratios reduces NOx formation. Such lean burning, however, requires that the fuel be well distributed throughout the combustion air without creating any locally rich zones.

Gas turbines are capable of operating on both gaseous and liquid fuels. Unfortunately, the geometry associated with such fuel distribution requires a complex structure that makes the incorporation of a dual fuel capability into the combustor extremely difficult.

It is therefore desirable to provide a combustor that is capable of stable combustion with very lean mixtures of fuel and air, so as to reduce the formation of NOx, and that is capable of operation on liquid as well as gaseous fuel.

SUMMARY OF THE INVENTION

Accordingly, it is the general object of the current invention to provide a combustor that is capable of stable combustion with very lean mixtures of fuel and air, so as to reduce the formation of NOx, and that is capable of operation on liquid as well as gaseous fuel.

Briefly, this object, as well as other objects of the current invention, is accomplished in a combustor for producing a hot gas by burning a fuel in air, the combustor having (i) a combustion zone, (ii) a first annular passage for mixing fuel and air, the first annular passage in flow communication with the combustion zone, (iii) a first manifold for introducing a liquid fuel into the first annular passage so as to circumferentially distribute the liquid fuel around the first passage, and (iv) a second manifold for introducing a gaseous fuel into the first annular passage so as to circumferentially distribute the gaseous fuel around the first passage, the first and second manifolds joined together to form an integral manifold assembly.

In a preferred embodiment of the invention, the second manifold has an area projected onto a plane perpendicular to the axial direction, and the area of the first and second manifolds as joined into an integral assembly projected onto that plane is substantially the same as the projected area of the first manifold.

DESCRIPTION OF THE PREFERRED EMBODIMENT

Figure 1:
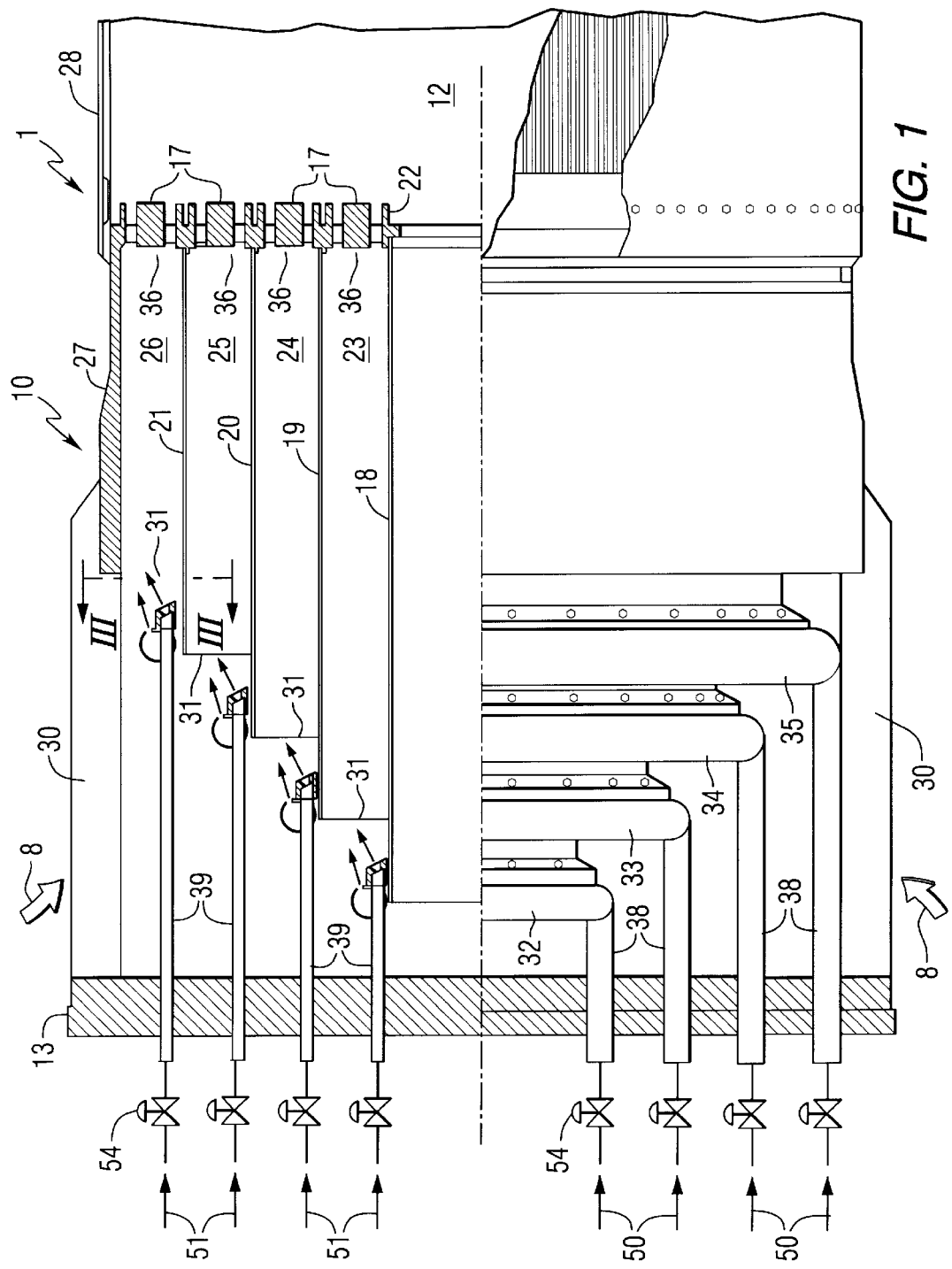
FIG. 1 is a longitudinal cross-section, partially schematic, of a combustor incorporating the dual fuel injection system according to the current invention.

Referring to the drawings, there is shown in FIG. 1 a combustor 1 for a gas turbine, specifically, a combustor designed to generate very low levels of NOx. The combustor 1 according to the current invention comprises a pre-mixing zone 10, in which air and fuel are mixed, and a combustion zone 12 downstream of the pre-mixing zone. A housing 27, having a flange 13 at its front end, encloses the mixing zone 10 of the combustor 1. Large window-type openings 30 are spaced around the circumference of the housing 27 and allow combustion air 8 to enter the combustor 1. A duct 28 is attached to the aft end of the housing 27 and encloses the combustion zone 12. Cooling passages (not shown) are formed around the circumference of the duct 28 so as to allow the introduction of film cooling air. An outlet (not shown) is formed at the aft end of the duct 28 for discharging the hot gas produced in the combustor 1 to the turbine section of the gas turbine.

As also shown in FIG. 1, four cylindrical liners 18–21 are concentrically arranged in the mixing zone 10 of the combustor 1 and, together with the housing 27, form four annular fuel premixing passages 23–26, one annular passage being formed between each adjacent pair of liners. Each of the annular passages has an inlet end 31 and a discharge end 36. Baffles or other turbulence enhancing devices may be incorporated into the passages 23–26 to aid in mixing of the fuel and air. A swirl plate 22 is attached at the aft end of the liners 18–21 adjacent the discharges 36 of the annular passages and separates the mixing portion 10 of the combustor from the combustion zone 12. A plurality of swirlers 17 are disposed in the swirl plate 22 so as to be circumferentially distributed around each of the annular passages 23–26 adjacent their discharge ends 36. The swirlers 17 are adapted to impart rotation to the fuel and air, thereby promoting mixing of the fuel and air and causing recirculation that serves to anchor the flame.

As also shown in FIG. 1, according to the current invention, a dual fuel injection assembly is disposed in the combustor 1. The dual fuel injection assembly is comprised of four concentric toroidal dual fuel manifold assemblies 32–35. Each dual fuel manifold assembly 32–35 is disposed just upstream of the inlet 31 of one of the annular passages 23–26.

Figure 2:
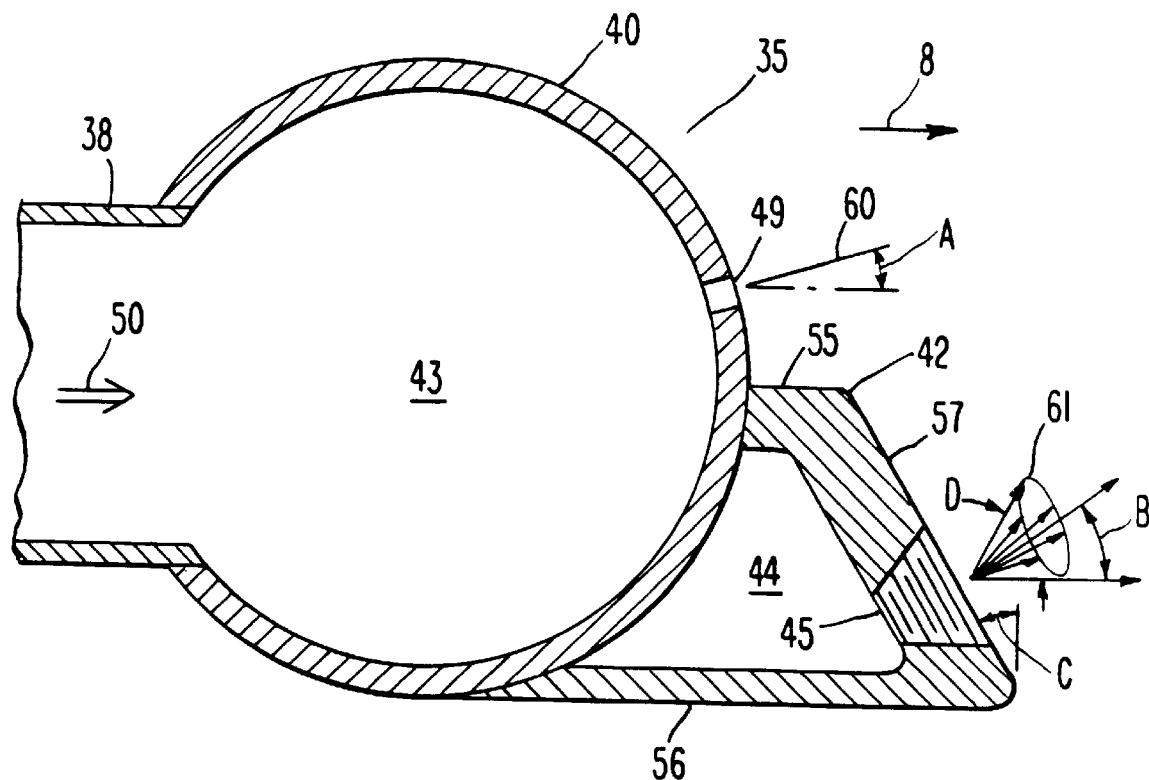
FIG. 2 is a detailed view of the dual fuel manifold assembly shown in FIG. 1 in the vicinity of the gas supply pipe.
Figure 5:
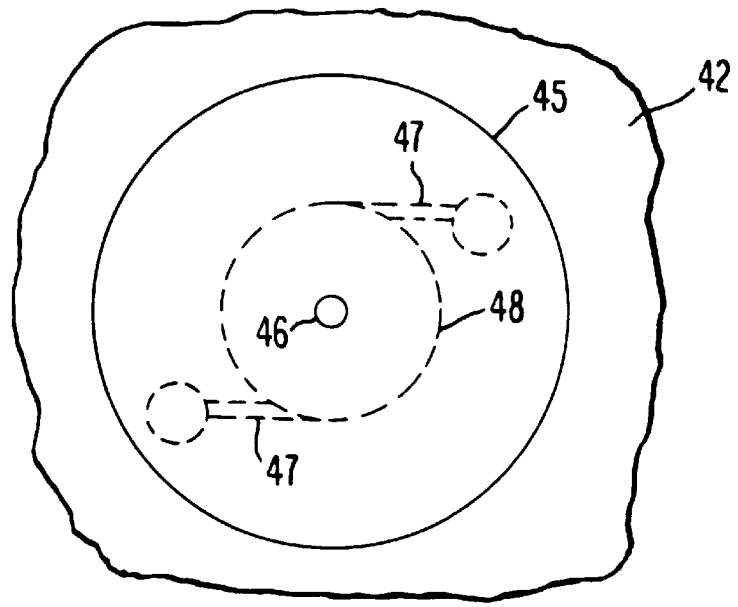
FIG. 5 is a detailed view of one of the liquid fuel nozzles shown in FIG. 3.
Figure 3:
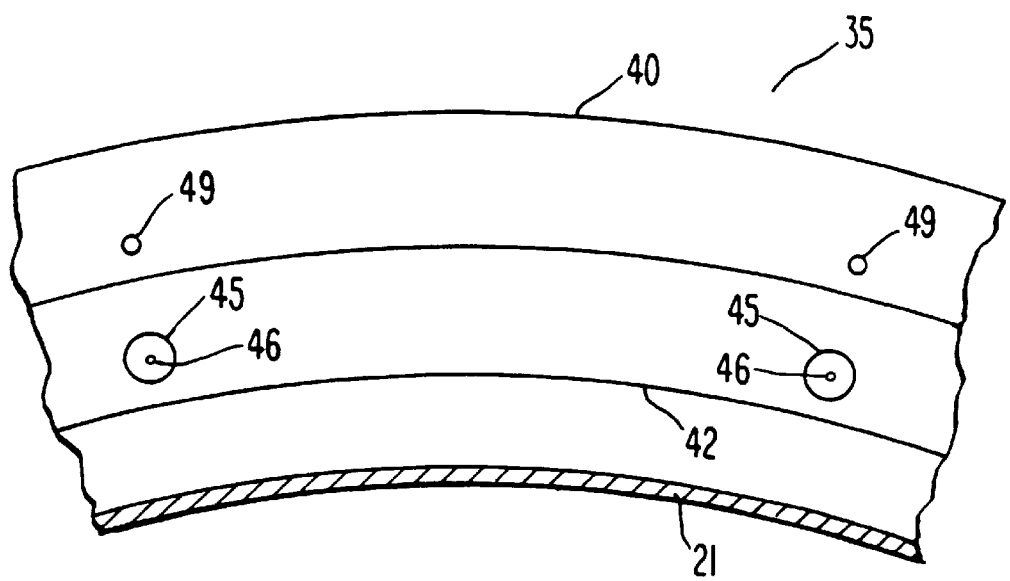
FIG. 3 is a transverse cross-section taken through line III—III shown in FIG. 1.
Figure 4:
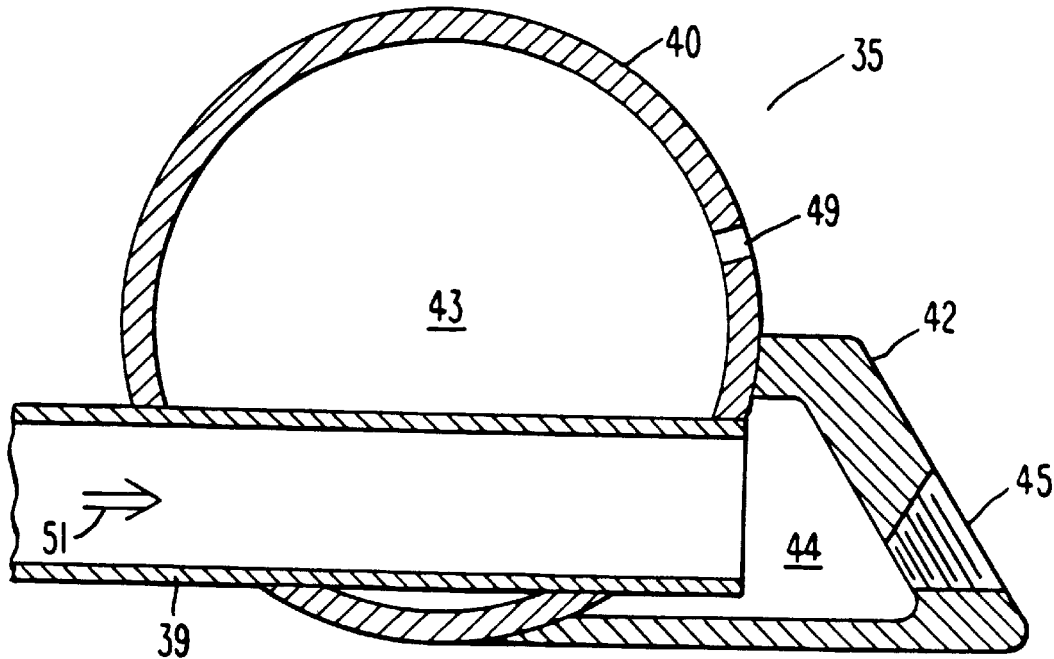
FIG. 4 is a detailed view of the dual fuel manifold assembly shown in FIG. 1 in the vicinity of the liquid fuel supply pipe.

As also shown in FIGS. 1 and 2, axially extending fuel supply tubes 38 are connected to each of the four dual fuel manifold assemblies 32–35 and direct a gaseous fuel 50 to the manifolds. In addition, axially extending fuel supply tubes 39 are also connected to each of the four dual fuel manifold assemblies 32–35 and direct liquid fuel 51 to the manifolds, as shown in FIGS. 1 and 4. Thus, each dual fuel manifold assembly 32–35 is supplied with both gaseous and liquid fuel by a separate fuel supply tube. A flow control valve 54 is installed in each of the fuel supply tubes 38 and 39 so that the flow of either gaseous or liquid fuel from fuel supplies (not shown) to each manifold can be individually controlled. Thus, according to the current invention, the supply of fuel to each annular passage 23–26 can be separately controlled. In the preferred embodiment, the gaseous fuel is natural gas and the liquid fuel is a distillate oil.

One of the dual fuel manifold assemblies according to the current invention is shown in detail in FIGS. 2–5. According to an important aspect of the current invention, each manifold assembly consists of separate gas and liquid fuel manifolds 40 and 42, respectively, that are joined together so as to form an integral unit.

The gas manifold 40 is generally circular in cross-section and forms a passage 43 that extends around the circumference of the inlet 31 of its respective annular passage 23–26. As shown best in FIG. 2, the gaseous fuel supply tube 38 is connected to the upstream end of the gas manifold 40 at approximately the 9 o'clock location. A plurality of rearward facing fuel discharge ports 49 are distributed around the circumference of the gas fuel manifold 40 at its downstream end. In the preferred embodiment of the invention, the discharge ports 49 are spaced at relatively small intervals so that the gaseous fuel 50 is evenly distributed around the circumference of the annular passages 23–26. In addition, each of the fuel discharge ports 49 is located slightly above the three o'clock location on the gas manifold 40 so that it is oriented at an angle A to the axis of the combustor 1, the axial direction being generally the direction in which the air 8 flows into the annular passages 23–26. As a result, the discharge ports 49 direct fine streams of gaseous fuel 60 radially outward into each of the annular passages 23–26, thereby promoting mixing. In the preferred embodiment of the invention, the angle A is approximately 18.

As shown in FIG. 2, the liquid fuel manifold 42 forms a passage 44 that extends around the circumference of the inlet 31 of its respective annular passage 23–26. The liquid manifold 42 is created by three circumferentially extending walls 55–57 joined so as to form a shape having a generally trapezoidal cross-section. The outer wall 55 extends axially rearward from the gas manifold 40 and is integrally attached to the gas manifold, for example by welding, just below the gaseous fuel discharge port 49 at approximately the three o'clock location, i.e., midway between the radially outward-most and radially inward-most locations on the gas manifold. The inner wall 56 also extends axially rearward and is attached to the gas manifold at approximately the six o'clock location, i.e., the radially inward-most location. The rear wall 57 extends between the inner and outer walls 56 and 55, respectively. The portion of the circumference of the gas manifold between approximately the three and six o'clock locations separates the gas passage 43 from the liquid fuel passage 44. Thus, the liquid fuel passage 44 is bounded on three sides by the walls 55–57 and on a fourth side by a portion of the circumference of the gas manifold 40.

As shown best in FIG. 4, the liquid fuel supply tube 39 penetrates through the gas manifold 40 and enters the liquid fuel passage 44 through the portion of the circumference of the gas manifold that separates the gas passage 43 from the liquid fuel passage.

According to an important aspect of the current invention, the liquid fuel manifold 42 is attached to the gas fuel manifold 40 so as to minimize the obstruction to the flow of air 8 into the annular passages 23–26. In fact, in terms of the area projected onto a plane perpendicular to axis of the combustor 1, i.e., perpendicular to the direction of the flow of air 8, the liquid fuel manifold 42 creates no increase in area—that is, it is entirely within the shadow of the gas fuel manifold 40.

A plurality of rearward facing fuel nozzles 45 are distributed around the circumference of the rear wall 57 of each of the liquid fuel manifolds 42. The fuel nozzles 45 are preferably of the photoetch plate type sold by Parker Hannefin and consist of three plates brazed together. As shown in FIG. 4, two passages 47 in the fuel nozzle 45 direct the liquid fuel into the periphery of a passage 48 so as to impart rotation to the fuel. From the passage 48, the fuel is discharged through an orifice 46 that produces a fine cone-shaped spray of fuel 61. As shown in FIG. 2, the cone of fuel 61 defines an included cone angle D.

As shown in FIG. 2, the fuel nozzles 45 are threaded into tapped holes in the manifold 42. However, the fuel nozzles 45 could also be brazed to the manifold 42. In the preferred embodiment of the invention, the fuel nozzles 45 are spaced at relatively small intervals so that the liquid fuel 50 is evenly distributed around the circumference of the annular passages 23–26.

As shown in FIG. 2, according to an important aspect of the current invention, the rear wall 57 of the liquid fuel manifold 42 is oriented at an angle C with respect to the radial direction. Thus, the fuel nozzles 45 will be oriented at an angle B to the axial direction that is equal to the angle C. As a result, each of the fuel nozzles 45 directs the cone of liquid fuel 61 such that the centerline of the cone is oriented at an angle C with respect to the axial direction. Consequently, the liquid fuel is directed into the radially outward regions of each of the annular passages 23–26, thereby promoting mixing.

Preferably, the angles B and C are equal to one-half the included cone angle D of the fuel discharged from the fuel nozzles 45 to ensure that the lower edge of the cone of fuel 61 does not project radially inward, which would be undesirable from the standpoint of fuel mixing. Thus, in one embodiment of the invention, the fuel nozzle 45 produces a spray of liquid fuel 61 having an included cone angle D of 60 and the rear wall 57 of the liquid fuel manifold 42 is oriented at an angle C of 30 to the radial direction so the fuel nozzles 45 are oriented at an angle B of 30 to the axial direction. Thus, the lower most portion of the cone of fuel 61 is oriented in the axial direction, i.e., an angle of approximately 0, and no portion of the fuel is initially directed in the radially inward direction.

In operation, the combustion air 8 is divided into streams that flow through each of the annular passages 23–26. According to the current invention, ultra-lean premixed combustion is obtained by introducing either gaseous or liquid fuel at lean fuel/air mixtures into the annular passages 23–26 via the dual fuel manifolds 32–35. As the fuel flows through the annular passages 23–26 a high degree of mixing between the fuel and air 8. Such mixing ensures that the resulting streams of fuel and air have lean fuel/air ratios throughout. As a result, there are no locally fuel rich zones that would promote the generation of NOx. After flowing through the annular passages 23–26, the fuel/air mixtures exit the pre-mixing zone 10, via the swirlers 17, and enter the combustion zone 12. In the combustion zone 12, the lean fuel/air mixtures are combusted.

The present invention may be embodied in other specific forms without departing from the spirit or essential attributes thereof and, accordingly, reference should be made to the appended claims, rather than to the foregoing specification, as indicating the scope of the invention.

What is claimed is:

1. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first passage; and d) a second manifold for introducing a gaseous fuel into said first annular passage so as to circumferentially distribute said gaseous fuel around said first passage, said first and second manifolds joined together to form an integral manifold assembly;

e) wherein said combustor defines an axial direction, and wherein said first annular passage has a flow area axially projected onto a plane perpendicular to said axial direction, and wherein said second manifold has an area axially projected onto said flow area projected area, and wherein the area axially projected onto said flow area by said first and second manifolds as joined into said integral manifold assembly is substantially the same as said projected area of said second manifold.

2. The combustor according to claim 1, wherein said first annular passage has an inlet, and wherein said first and second manifolds are each toroidal and extend circumferentially around said inlet of said first annular passage.

3. The combustor according to claim 2, further comprising first and second toroidal passages formed in said in said first and second manifolds, respectively, said first and second toroidal passages being separated by a wall of one of said manifolds.

4. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first annular passage; and d) a second manifold for introducing a gaseous fuel into said first annular passage so as to circumferentially distribute said gaseous fuel around said first annular passage, said first and second manifolds joined together to form an integral manifold assembly, wherein said second manifold has a substantially circular cross-section and said first manifold has a substantially trapezoidal cross-section.

5. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first annular passage; and (d) a second manifold for introducing a gaseous fuel into said first annular passage so as to circumferentially distribute said gaseous fuel around said first annular passage, said first and second manifolds joined together to form an integral manifold assembly, wherein said second manifold has a circumferentially extending row of gaseous fuel discharge ports formed therein, and wherein said first manifold is joined to said second manifold at a location radially inward from said row of gaseous fuel discharge ports.

6. The combustor according to claim 1, wherein said second manifold has a first radially outward-most location and a second radially inward-most location, and wherein said first manifold is joined to said second manifold at a third location between said first and second locations.

7. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first passage; and d) a second manifold for introducing a gaseous fuel into said first annular passage so as to circumferentially distribute said gaseous fuel around said first passage, said first and second manifolds joined together to form an integral manifold assembly, a nd wherein said second manifold has a first radially outward-most location and a second radially inward-most location, and wherein said first manifold is joined to said second manifold at a third location between said first and second locations, and wherein said third location is approximately mid-way between said first and second locations.

8. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said firs t annular passage so as to circumferentially distribute said liquid fuel a round said first passage; and d) a second manifold for introducing a gaseous fuel into said first annular passage so as to circumferentially distribute said gaseous fuel around said first passage, said first and second manifolds joined together to form an integral manifold assembly, and wherein said second manifold has a first radially outward-most location and a second radially inward-most location, and wherein said first manifold is joined to said second manifold at a third location between said first and second locations, and wherein said first manifold is also joined to said second manifold at said second location.

9. The combustor according to claim 8, wherein said first manifold comprises a wall that extends in substantially the axial direction from said second location.

10. The combustor according to claim 1, wherein said first manifold comprises a first wall, said first wall extending at an angle to the radial direction.

11. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first annular passage; and d) a second manifold for introducing a gaseous fuel into said first annular passage so as to circumferentially distribute said gaseous fuel around said first annular passage, said first and second manifolds joined together to form an integral manifold assembly, and wherein said first manifold comprises a first wall, said first wall extending at an angle to a radial direction, and further comprising a plurality of liquid fuel nozzles disposed in said first wall of said first manifold, whereby said liquid fuel nozzles eject said liquid fuel at a first angle to an axial direction.

12. The combustor according to claim 11, wherein said liquid fuel nozzles have means for discharging said liquid fuel in a cone-shaped spray pattern, said cone defining an included angle, said first angle being approximately equal to one-half said included angle of said cone.

13. A combustor for producing a hot gas by burning a fuel in air, said combustor having:

a) a combustion zone;

b) a first annular passage for mixing fuel and air, said first annular passage in flow communication with said combustion zone;

c) a first manifold for introducing a liquid fuel into said first annular passage so as to circumferentially distribute said liquid fuel around said first annular passage; and d) a second manifold for introducing a gaseous fuel into said first annular passage so as to circumferentially distribute said gaseous fuel around said first annular passage, said first and second manifolds joined together to form an integral manifold assembly, further comprising:

e) second and third annular passages for mixing fuel and air, said second and third annular passages in flow communication with said combustion zone;

f) third and fourth manifolds for introducing a liquid fuel into said third and fourth annular passages, respectively, so as to circumferentially distribute said liquid fuel around said third and fourth passages; and g) fifth and sixth manifolds for introducing a gaseous fuel into said third and fourth annular passages, respectively, so as to circumferentially distribute said gaseous fuel around said third and fourth passages, said third and fifth manifolds joined together to form a second integral manifold assembly, said fourth and sixth manifolds joined together to form a third integral manifold assembly.

14. A combustor for producing a hot gas by burning a fuel in air, said combustor having:

a) a combustion zone;

b) an annular passage for mixing first and second fuels into air, said first annular passage in flow communication with said combustion zone, said annular passage having an inlet for receiving flows of said first and second fuels and said air;

c) a manifold assembly for injecting said first and second fuels into said annular passage inlet, said manifold assembly comprising (i) a first ring disposed proximate said annular passage inlet and extending circumferentially therearound, said first ring having means for introducing said first fuel into said annular passage inlet, (ii) a second ring disposed proximate said annular passage inlet and extending circumferentially therearound, said second ring having means for introducing said second fuel into said annular passage inlet, said second ring being at least partially formed by a first wall, said first wall integrally joined to said first ring at a first location thereon, and d) wherein said second ring further comprises a means for ejecting said second fuel at an angle to an axial direction.

15. The combustor according to claim 14, wherein second ring is at least partially formed by a second wall, said second wall integrally joined to said first ring at a second location thereon.

16. The combustor according to claim 15, wherein said second ring is formed at least in part by a third wall, and wherein said first and second and third walls form at least a portion of the boundary of a passage for containing said second fuel.

* * * * *

UNITED STATES PATENT AND TRADEMARK OFFICE
CERTIFICATE OF CORRECTION

PATENT NO.     : 6,092,363
DATED          : July 25, 2000
INVENTOR(S)    : William Richard Ryan Page 1 of 1

It is certified that error appears in the above-identified patent and that said Letters Patent is hereby corrected as shown below:

<u>Title page,</u>
Item [56], References Cited, U.S. PATENT DOCUMENTS,
Patent 5,351,477 Joshi et al. add Class/Subclass -- 60/39,463 --.

<u>Column 6,</u>
Line 37, "firs t" should read -- first --.
Line 38, "a round" should read -- around --.

Signed and Sealed this

Eleventh Day of June, 2002

*Attest:*

JAMES E. ROGAN
*Attesting Officer*       *Director of the United States Patent and Trademark Office*